Sept. 1, 1936.                L. D. FOLEY                2,053,026
                           AUTOMATIC GEAR SHIFT
                            Filed Nov. 16, 1935
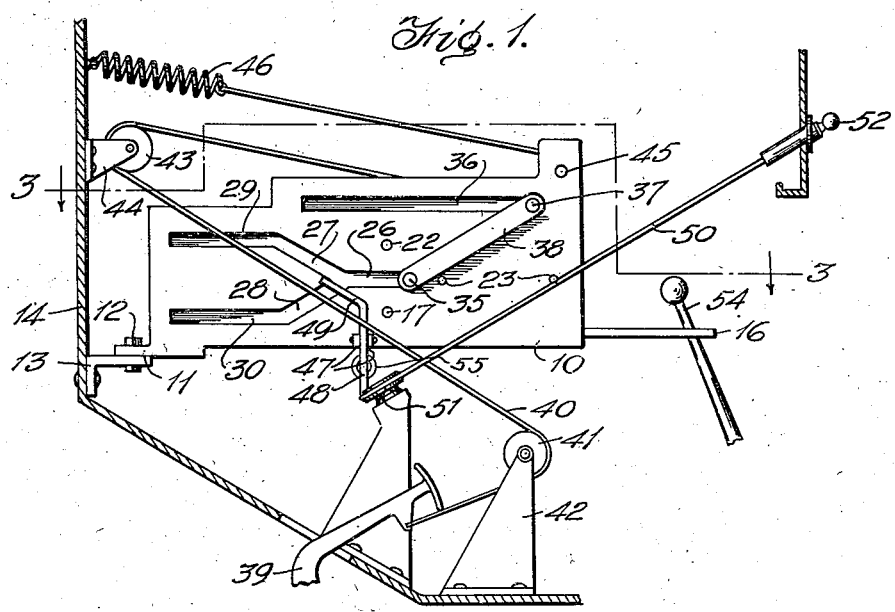
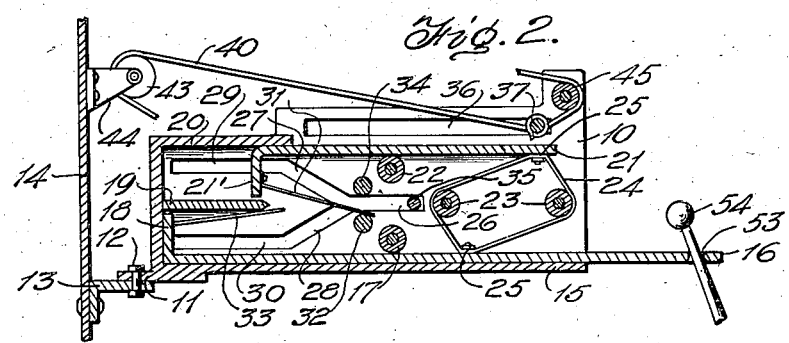
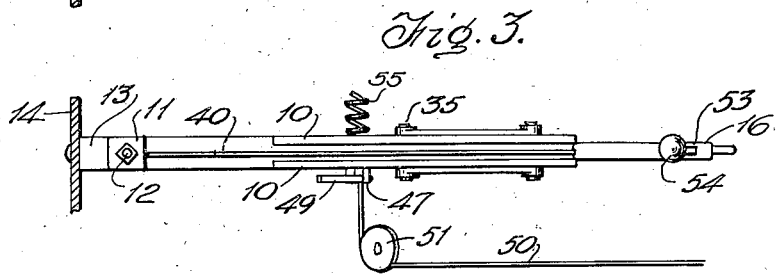
INVENTOR.
Louis D. Foley
BY
J. Kahlan
ATTORNEY.

Patented Sept. 1, 1936

2,053,026

UNITED STATES PATENT OFFICE 2,053,026

AUTOMATIC GEAR SHIFT

Louis D. Foley, Louisville, Ky.

Application November 16, 1935, Serial No. 50,201

10 Claims. (Cl. 74—474)

This invention relates to automobiles and has special reference to operating means for the gear shift levers of such vehicles.

One important object of the invention is to provide a novel mechanical device whereby the gear shift lever of an automobile is moved from one position to another by depression of the clutch pedal of the vehicle.

A second important object of the invention is to provide a novel device of this character arranged to move the gear shift lever through successive operating positions by successive depressions of the vehicle clutch pedal.

A third important object of the invention is to provide a novel device of this character which may be applied to any automobile having a gear shift lever and a clutch pedal without changing the existing arrangements of these parts, the improved device being in the form of a simple attachment for such purpose.

A fourth important object of the invention is to provide a novel device of this character which will move the gear shift automatically through its successive positions without possibility of omitting the intermediate second gear step in shifting from low gear to high gear.

A fifth important object of the invention is to provide a novel device of this character which will permit operation of the gear shift lever by either actuation of the clutch pedal or manually as the driver of the car may desire.

With the above and other objects in view, as will be presently apparent, the invention consists in general of certain novel details of construction and combinations of parts hereinafter fully described, illustrated in the accompanying drawing and particularly pointed out in the appended claims.

In the accompanying drawing like characters of reference indicate like parts in the several views and:

Figure 1 is a side elevation of the invention showing it applied to the clutch pedal and gear shift lever of an automobile.

Figure 2 is a vertical longitudinal section on the central plane of the invention.

Figure 3 is a section on line 3—3 of Figure 1, certain of the parts being omitted to more clearly disclose those shown.

In the embodiment of the invention here illustrated there is provided a frame including a pair of side plates 10 supported on a bracket 11 which is mounted by a pivot 12 on a bracket 13 fixed in a convenient position on the dash board 14 of the automobile to which the device is attached. This permits the rear end of the device to swing laterally. Resting on the bottom 15 of the casing is a bar 16 which is held in position by a roller 17 mounted in the casing and resting on the bar 16. The forward end of the bar is provided with an upturned end 18 and just above the top of this end 18 a partition 19 is fixed between the casing sides 10. Supported beneath the top 20 of the casing is a second bar 21 which rests on a roller 22 supported in the casing. This bar 21 has a down turned end 21' which extends to a point just above the partition 19.

The bars 16 and 21 are connected in the following manner so that when one bar moves the other also moves but in the opposite direction. A pair of rollers 23 are mounted in the casing, the rollers 23 being spaced longitudinally of the casing toward the front thereof and having their axis in the plane of the partition 19. An endless band 24 extends around the rollers and is secured at points 25 to the bars 16 and 21, the band being sufficiently long for this purpose. The two points 25 are so spaced that the band portions between the points are equal. It will be plain that, with this construction, the two bars 16 and 21 are so connected that movement of one moves the other in the opposite direction.

In each side 10 of the casing there is provided a slot 26 arranged forwardly of and in alinement with the partition 19. At its rear end this slot communicates with an upwardly inclined slot 27 and a downwardly inclined slot 28. The slots 27 and 28 terminate rearwardly in parallel slots 29 and 30 spaced equally above and below the partition 19. The lower end of the end 21' carries a forwardly extending leaf spring 31 which inclines downwardly at its forward end when the bar 21 is in forward position and rests on a stop or lug 32 when thus positioned. Similarly, the end 18 carries a spring 33 which inclines upwardly and bears against a lug 34 in its forward position. These springs are of such length that, with the spring 31 forward the slots 28 are closed, with the spring 33 forward, the slots 27 are closed and with the ends 18 and 21' alined both springs are positioned to leave both the slots 27 and the slots 28 opened. Extending across the casing is a rod 35 which has its ends projecting through opposite portions of the slots just described.

Each side 10 of the casing is provided with a longitudinal slot 36 in its upper part and through the slots 36 extends a rod 37 the ends of which are connected to the rod 35 by links 38 arranged on opposite sides of the casing. These links are inclined downwardly and rearwardly but at an angle such that movement of the rod 37 causes movement of the rod 35.

To the clutch pedal 39 is connected one end of a flexible cable 40 which extends around an idler 41 mounted on a bracket 42 secured to some suitable part of the automobile. From there the cable passes forwardly and around an idler 43 mounted on a bracket fixed to the dash board 14 vertically above the bracket 13. From the pulley 43 the cable 40 extends to and is attached to the rod 37 at 44 from which point the cable passes around a pulley 45 supported between the sides 10 at the upper rear corner of the casing. The cable then extends rearwardly and is attached to the forward end of a spring 46 the rear end of which is attached to a suitable fixed point. With this arrangement depression of the pedal 39 causes the rod 37 to move forward and tension the spring 46 and upon the pressure on the pedal being relaxed the spring will draw the rod 37 backward.

One of the sides 10 carries a pair of lugs 47 between which is pivoted a lever 48 having a bent end 49 adapted, with the lever end moved inwardly, to be engaged by the forward end of a link 38 so as to direct the rod 35 into the slots 27 as it moves forwardly.

Attached to the other end of the lever 48 is a cable 50 which passes over an idler 51 and leads rearwardly to a pull knob 52 at the instrument board. Upon pulling this cable 50 the rear end of the casing and the parts held thereby will swing to the left of the automobile.

A suitable opening 53 is formed in the bar 16 and through this opening passes the upper part of the usual gear shift lever 54. A spring 55 has one end attached to the lever 48 and has its opposite end attached to a bracket (not shown) suitably fixed to a part of the automobile so that the lever 48 has its upper end constantly urged away from the casing, the latter being also urged to the right.

To understand the operation let it be assumed that the gear shift lever is in neutral position and that the pedal is not depressed so that the clutch is engaged. Also let it be assumed that the shifting of gears is accomplished in the conventional manner, the positions of the lever 54 being left-forward for reverse, left-rearward for first gear, right-forward for second gear and right-rearward for third or high gear. Under these conditions both spring gates 31 and 33 will be open. If, from this position it be desired to move the lever 54 to reverse position, the clutch pedal is depressed whereupon the rods 37 and 35 are moved forwardly and the rod 35 moves by gravity into the slots 28. Before the rod has engaged the end 18 and after the rod 35 has just passed the lever end 49 and entered the slot 28, the knob 52 is pulled whereupon the rear end of the casing and the lever 54 are moved to the left. By continuing the depression of the pedal 39 the rod 35 engages the end 18 and moves the bar 16 and lever 54 forward to reverse position. The knob 52 may now be released, because the gear shift lever L moves in the usual H-slot of the transmission gear arrangement common to all automobiles; and the device will remain swung to the left. Upon the pressure on the pedal being released the spring 46 causes the rod 35 to move back to its normal position. If it now be desired to restore the lever 54 to neutral position, by depression of the pedal 39, the bar 35 moves forward and engages the spring gate 28 on which it rides to pass up the inclined slots 27 and engage the bar end 21'. This pushes the bar 21 forwardly and causes the bar 16 to move rearwardly which moves the lever 54 rearwardly also. When the lever 54 has reached the neutral position pressure on the pedal is relaxed and the rod 35 returns to its normal position.

If, from neutral position it is desired to shift to first or low gear the knob 52 is pulled whereupon the casing swings to the left and at the same time the lever end 49 closes a slot 28. Now, when the pedal is depressed, the rod 35 will move forwardly, be guided by the lever end 49 into the slots 27 and engage the bar end 21'. Continuing the movement of the pedal forces the bar 21 forward and this causes the bar 16 and shift lever to move back to first or low gear position. The clutch pedal is then relaxed.

In order to pass from low to second gear it is not necessary to touch the knob 52 since the lever L itself holds the casing to the left. All that is necessary is to give the clutch pedal full depression. This causes the rod 35 to move forwardly and engage the spring gate 33 which, in low gear position, closes the slots 27 and to be guided downward to engage the end 18 push the bar 16 forward and move the bar 21 rearward. As the shift lever passes the neutral point the spring 55 pulls the rear end of the casing to the right so that further depression of the clutch pedal moves the shift lever forwardly into second gear position. To shift from second gear to third or high gear it is merely necessary to again depress the clutch lever without pulling the knob 52. The action now will be the same as in passing to reverse gear position except that, since the casing is swung to the right, the shift lever is moved directly to the rear from second gear position.

Obviously shifting from third or high gear to second, then to first and then to neutral is accomplished in a similar manner.

There has thus been provided a simple, and efficient device of the kind described and for the purpose specified.

It is obvious that changes may be made in the form and construction of the invention without departing from the material principles involved. It is not therefore desired to confine the invention to the exact form herein shown and described but it is desired to include all such as come within the scope of the appended claims.

Having described my invention, I claim:

1. An attachment for automobiles of the type having a clutch pedal and a gear shift lever, said attachment including a casing provided with means at its forward end for pivotally attaching the casing to a fixed part of the automobile whereby the rear end of the casing may swing laterally, a bar mounted in said casing for movement longitudinally of the casing, said bar projecting rearwardly from the casing and having its rear end provided with means for operative engagement of the gear shift lever, a second bar slidably mounted in said casing for movement longitudinally thereof, an operative connection between said bars causing the bars to move in opposite directions, a reciprocable element in said casing, means for connecting the reciprocable element to the clutch pedal to move the element forwardly as the pedal is depressed, and guides on the casing guiding said element into operative engagement with said bars alternately.

2. An attachment for automobiles of the type having a clutch pedal and a gear shift lever, said attachment including a casing provided with means at its forward end for pivotally attaching the casing to a fixed part of the automobile whereby the rear end of the casing may swing laterally, a bar mounted in said casing for movement longitudinally of the casing, said bar projecting rearwardly from the casing and having its rear end provided with means for operative engagement of the gear shift lever, a second bar slidably mounted in said casing for movement longitudinally thereof, an operative connection between said bars causing the bars to move in opposite directions, a reciprocable element in said casing, means for connecting the reciprocable element at the clutch pedal to move the element forwardly as the pedal is depressed, guides on the casing guiding said element into operative engagement with said bars alternately, and a spring normally holding said element in inoperative position.

3. An attachment for automobiles of the type having a clutch pedal and a gear shift lever, said attachment including a casing provided with means at its forward end for pivotally attaching the casing to a fixed part of the automobile whereby the rear end of the casing may swing laterally, a bar mounted in said casing for movement longitudinally of the casing, said bar projecting rearwardly from the casing and having its rear end provided with means for operative engagement of the gear shift lever, a second bar slidably mounted in said casing for movement longitudinally thereof, an operative connection between said bars causing the bars to move in opposite directions, a reciprocable element in said casing, means for connecting the reciprocable element to the clutch pedal to move the element forwardly as the pedal is depressed, guides on said casing having rear portions provided at their forward ends with arms diverging towards the respective bars, and gate means carried by said bars and each closing a respective guide arm in rearward position of the respective bar to guide the said element into the other arm to engage the rearwardly positioned bar.

4. An attachment for automobiles of the type having a clutch pedal and a gear shift lever, said attachment including a casing provided with means at its forward end for pivotally attaching the casing to a fixed part of the automobile whereby the rear end of the casing may swing laterally, a bar mounted in said casing for movement longitudinally of the casing, said bar projecting rearwardly from the casing and having its rear end provided with means for operative engagement of the gear shift lever, a second bar slidably mounted in said casing for movement longitudinally thereof, an operative connection between said bars causing the bars to move in opposite directions, a reciprocable element in said casing, means for connecting the reciprocable element to the clutch pedal to move the element forwardly as the pedal is depressed, guides on said casing having rear portions provided at their forward ends with arms diverging towards the respective bars, gate means carried by said bars and each closing a respective guide arm in rearward position of the respective bar to guide the said element into the other arm to engage the rearwardly positioned bar, and a spring normally holding said element in inoperative position.

5. An attachment for automobiles of the type having a clutch pedal and a gear shift lever, said attachment including a casing provided with means at its forward end for pivotally attaching the casing to a fixed part of the automobile whereby the rear end of the casing may swing laterally, a bar mounted in said casing for movement longitudinally of the casing, said bar projecting rearwardly from the casing and having its rear end provided with means for operative engagement of the gear shift lever, a second bar slidably mounted in said casing for movement longitudinally thereof, an operative connection between said bars causing the bars to move in opposite directions, a reciprocable element in said casing, means for connecting the reciprocable element to the clutch pedal to move the element forwardly as the pedal is depressed, guides on the casing guiding said element into operative engagement with said bars alternately, a biasing spring urging the rear end of the casing laterally, and manually operable means connected to the casing for swinging the same against the action of the biasing spring.

6. An attachment for automobiles of the type having a clutch pedal and a gear shift lever, said attachment including a casing provided with means at its forward end for pivotally attaching the casing to a fixed part of the automobile whereby the rear end of the casing may swing laterally, a bar mounted in said casing for movement longitudinally of the casing, said bar projecting rearwardly from the casing and having its rear end provided with means for operative engagement of the gear shift lever, a second bar slidably mounted in said casing for movement longitudinally thereof, an operative connection between said bars causing the bars to move in opposite directions, a reciprocable element in said casing, means for connecting the reciprocable element to the clutch pedal to move the element forwardly as the pedal is depressed, guides on the casing guiding said element into operative engagement with said bars alternately, a spring normally holding said element in inoperative position, a biasing spring urging the rear end of the casing laterally, and manually operable means connected to the casing for swinging the same against the action of the biasing spring.

7. An attachment for automobiles of the type having a clutch pedal and a gear shift lever, said attachment including a casing provided with means at its forward end for pivotally attaching the casing to a fixed part of the automobile whereby the rear end of the casing may swing laterally, a bar mounted in said casing for movement longitudinally of the casing, said bar projecting rearwardly from the casing and having its rear end provided with means for operative engagement of the gear shift lever, a second bar slidably mounted in said casing for movement longitudinally thereof, an operative connection between said bars causing the bars to move in opposite directions, a reciprocable element in said casing, means for connecting the reciprocable element to the clutch pedal to move the element forwardly as the pedal is depressed, guides on said casing having rear portions provided at their forward ends with arms diverging towards the respective bars, gate means carried by said bars and each closing a respective guide arm in rearward position of the respective bar to guide the said element into the other arm to engage the rearwardly positioned bar, a biasing spring urging the rear end of the casing laterally, manually operable means connected to the casing for swinging the same against the action of the biasing spring.

8. An attachment for automobiles of the type having a clutch pedal and a gear shift lever, said attachment including a casing provided with means at its forward end for pivotally attaching the casing to a fixed part of the automobile whereby the rear end of the casing may swing laterally, a bar mounted in said casing for movement longitudinally of the casing, said bar projecting rearwardly from the casing and having its rear end provided with means for operative engagement of the gear shift lever, a second bar slidably mounted in said casing for movement longitudinally thereof, an operative connection between said bars causing the bars to move in opposite directions, a reciprocable element in said casing, means for connecting the reciprocable element to the clutch pedal to move the element forwardly as the pedal is depressed, guides on said casing having rear portions provided at their forward ends with arms diverging towards the respective bars, gate means carried by said bars and each closing a respective guide arm in rearward position of the respective bar to guide the said element into the other arm to engage the rearwardly positioned bar, a spring normally holding said element in inoperative position, a biasing spring urging the rear end of the casing laterally, manually operable means connected to the casing for swinging the same against the action of the biasing spring.

9. An attachment for automobiles of the type having a clutch pedal and a gear shift lever, said attachment including a casing provided with means at its forward end for pivotally attaching the casing to a fixed part of the automobile whereby the rear end of the casing may swing laterally, a bar mounted in said casing for movement longitudinally of the casing, said bar projecting rearwardly from the casing and having its rear end provided with means for operative engagement of the gear shift lever, a second bar slidably mounted in said casing for movement longitudinally thereof, an operative connection between said bars causing the bars to move in opposite directions, a reciprocable element in said casing, means for connecting the reciprocable element to the clutch pedal to move the element forwardly as the pedal is depressed, guides on said casing having rear portions provided at their forward ends with arms diverging towards the respective bars, gate means carried by said bars and each closing a respective guide arm in rearward position of the respective bar to guide the said element into the other arm to engage the rearwardly positioned bar, a biasing spring urging the rear end of the casing laterally, manually operable means connected to the casing for swinging the same against the action of the biasing spring, and a guide lever pivoted to the casing and operable by the last mentioned means upon operation of said means, said lever having a guide end movable upon operation of the guide lever into the path of said element and guiding the element into engagement with the second bar.

10. An attachment for automobiles of the type having a clutch pedal and a gear shift lever, said attachment including a casing provided with means at its forward end for pivotally attaching the casing to a fixed part of the automobile whereby the rear end of the casing may swing laterally, a bar mounted in said casing for movement longitudinally of the casing, said bar projecting rearwardly from the casing and having its rear end provided with means for operative engagement of the gear shift lever, a second bar slidably mounted in said casing for movement longitudinally thereof, an operative connection between said bars causing the bars to move in opposite directions, a reciprocable element in said casing, means for connecting the reciprocable element to the clutch pedal to move the element forwardly as the pedal is depressed, guides on said casing having rear portions provided at their forward ends with arms diverging towards the respective bars, gate means carried by said bars and each closing a respective guide arm in rearward position of the respective bar to guide the said element into the other arm to engage the rearwardly positioned bar, a spring normally holding said element in inoperative position, a biasing spring urging the rear end of the casing laterally, manually operable means connected to the casing for swinging the same against the action of the biasing spring, and a guide lever pivoted to the casing and operable by the last mentioned means upon operation of said means, said lever having a guide end movable upon operation of the guide lever into the path of said element and guiding the element into engagement with the second bar.

LOUIS D. FOLEY.